(12) United States Patent
Yamazaki et al.

(10) Patent No.: US 9,679,684 B2
(45) Date of Patent: Jun. 13, 2017

(54) VOLTAGE NONLINEAR RESISTIVE ELEMENT AND METHOD FOR MANUFACTURING THE SAME

(71) Applicant: NGK Insulators, Ltd., Nagoya (JP)

(72) Inventors: Satoshi Yamazaki, Nagoya (JP); Toru Hayase, Nagoya (JP); Kenji Morimoto, Kasugai (JP); Shinji Kawasaki, Nagoya (JP); Yukihisa Takeuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 125 days.

(21) Appl. No.: 14/662,625

(22) Filed: Mar. 19, 2015

(65) Prior Publication Data

US 2015/0270036 A1 Sep. 24, 2015

(30) Foreign Application Priority Data

Mar. 19, 2014 (JP) .................................. 2014-056497

(51) Int. Cl.
*H01C 7/112* (2006.01)
*C04B 35/453* (2006.01)
(Continued)

(52) U.S. Cl.
CPC ............ *H01C 7/112* (2013.01); *C04B 35/453* (2013.01); *C04B 35/62695* (2013.01); *C04B 37/005* (2013.01); *C04B 37/006* (2013.01); *H01C 7/10* (2013.01); *H01C 7/102* (2013.01); *H01C 7/12* (2013.01); *H01C 7/18* (2013.01); *H01C 17/00* (2013.01); *C04B 2235/322* (2013.01); *C04B 2235/3217* (2013.01); *C04B 2235/3267* (2013.01); *C04B 2235/3277* (2013.01);
(Continued)

(58) Field of Classification Search
CPC ..................................................... H01C 7/112
See application file for complete search history.

(56) References Cited

U.S. PATENT DOCUMENTS 3,962,144 A 6/1976 Matsuura et al.
4,272,754 A * 6/1981 Lou ...................... H01C 7/1013
257/43

(Continued)

FOREIGN PATENT DOCUMENTS

GB          764 693 A      1/1957
JP     2000-228302 A1      8/2000

OTHER PUBLICATIONS

Partial European Search Report (Application No. 15159814.1) dated Sep. 17, 2015.

(Continued)

*Primary Examiner* — James Harvey
(74) *Attorney, Agent, or Firm* — Burr & Brown, PLLC

(57) ABSTRACT

A voltage nonlinear resistive element includes a resistor containing a joined body in which a zinc oxide ceramic layer composed mainly of zinc oxide and having a volume resistivity of $1.0 \times 10^{-1}$ Ωcm or less is joined to a bismuth oxide layer composed mainly of bismuth oxide, and a pair of electrodes disposed on the resistor such that an electrically conductive path passes through a joint surface between the zinc oxide ceramic layer and the bismuth oxide layer. In this element, the zinc oxide ceramic layer of the joined body has a lower volume resistivity than before. This can result in a lower clamping voltage in a high-current region than before.

7 Claims, 4 Drawing Sheets

(51) Int. Cl.
- *H01C 7/102* (2006.01)
- *H01C 7/18* (2006.01)
- *H01C 17/00* (2006.01)
- *H01C 7/12* (2006.01)
- *C04B 35/626* (2006.01)
- *C04B 37/00* (2006.01)
- *H01C 7/10* (2006.01)

(52) U.S. Cl.
CPC ............ *C04B 2235/3284* (2013.01); *C04B 2235/3286* (2013.01); *C04B 2235/3294* (2013.01); *C04B 2235/3298* (2013.01); *C04B 2235/443* (2013.01); *C04B 2235/5436* (2013.01); *C04B 2235/5454* (2013.01); *C04B 2235/658* (2013.01); *C04B 2235/6586* (2013.01); *C04B 2235/661* (2013.01); *C04B 2235/96* (2013.01); *C04B 2237/06* (2013.01); *C04B 2237/125* (2013.01); *C04B 2237/126* (2013.01); *C04B 2237/34* (2013.01); *C04B 2237/708* (2013.01); *C04B 2237/72* (2013.01); *H01C 7/1006* (2013.01); *Y10T 29/49082* (2015.01)

(56) References Cited

U.S. PATENT DOCUMENTS

| | | |
|---|---|---|
| 4,296,002 A | 10/1981 | Sokoly et al. |
| 4,400,683 A | 8/1983 | Eda et al. |
| 6,279,811 B1 | 8/2001 | Ramarge et al. |
| 2004/0155750 A1 | 8/2004 | Nakamura |
| 2005/0160587 A1 | 7/2005 | Ramarge et al. |
| 2011/0033677 A1* | 2/2011 | Shin ............... B82Y 30/00 428/201 |
| 2012/0128872 A1* | 5/2012 | Doye ............... C23C 18/1208 427/160 |
| 2015/0270036 A1* | 9/2015 | Yamazaki ............ H01C 7/10 338/20 |
| 2015/0270037 A1* | 9/2015 | Yamazaki ............ H01C 7/10 338/20 |

OTHER PUBLICATIONS

Extended European Search Report (Application No. 15159814.1) dated Jan. 8, 2016.

U.S. Appl. No. 14/662,669, filed Mar. 19, 2015, Yamazaki, et al.

* cited by examiner

VOLTAGE NONLINEAR RESISTIVE ELEMENT AND METHOD FOR MANUFACTURING THE SAME

BACKGROUND OF INVENTION

1. Field of Invention

The present invention relates to a voltage nonlinear resistive element and a method for manufacturing the voltage nonlinear resistive element.

2. Description of Related Art

Voltage nonlinear resistive elements (varistors) are elements having a structure in which a voltage nonlinear resistor is disposed between a pair of electrodes, and are widely used as elements for protecting electronic circuits from abnormal voltage in various sensors, such as humidity sensors and temperature sensors. As a voltage nonlinear resistive element of this type, Patent Literature 1 discloses a voltage nonlinear resistive element that includes a resistor between a pair of electrodes, wherein the resistor has a structure in which an oxide film containing two oxides, such as $Bi_2O_3$ and $Sb_2O_3$, is disposed between two zinc oxide porcelains containing an oxide, such as $Al_2O_3$, as a dopant. This element can decrease the turn-on voltage $V_{1mA}$ (a terminal voltage at an electric current of 1 mA (0.4 A/cm² based on the shape of the element)) to approximately 3 V.

CITATION LIST

PTL 1: JP 2000-228302 A

SUMMARY OF THE INVENTION

In general, zinc oxides containing a dopant have lower resistance than zinc oxides free of dopants. Although the zinc oxide porcelains described in Patent Literature 1 are doped with 0.0009% to 0.018% by mass $Al_2O_3$, the resistance of the zinc oxide porcelains is not sufficiently low due to the very low dopant level. It is therefore highly likely that the voltage nonlinear resistive element described in Patent Literature 1 produces a high voltage in a high-current region (for example, in the case that an electric current of 20 A/cm² flows).

The present invention solves such problems and principally aims to lower the clamping voltage of a zinc oxide voltage nonlinear resistive element in a high-current region.

The present invention is directed to a voltage nonlinear resistive element including:

a voltage nonlinear resistor containing at least one joined body in which a zinc oxide ceramic layer composed mainly of zinc oxide and having a volume resistivity of $1.0 \times 10^{-1}$ Ωcm or less is joined to a bismuth oxide layer composed mainly of bismuth oxide, and a pair of electrodes disposed on the voltage nonlinear resistor such that an electrically conductive path passes through a junction between the zinc oxide ceramic layer and the bismuth oxide layer.

In this voltage nonlinear resistive element, the zinc oxide ceramic layer of the voltage nonlinear resistor is a zinc oxide ceramic layer having a lower volume resistivity than before. Thus, the clamping voltage in a high-current region (for example, in the case that an electric current of 20 A/cm² flows) can be lower than before. As a result, for example, even when a large current flows through a voltage nonlinear resistive element according to the present invention due to static electricity, a rise in voltage can be decreased, and the dielectric breakdown of the element can be prevented.

In a voltage nonlinear resistive element according to the present invention, the zinc oxide ceramic layer may contain one or more selected from the group consisting of $Al_2O_3$, $In_2O_3$, and $Ga_2O_3$. The addition of such a trivalent metal ion can relatively easily decrease the volume resistivity of the zinc oxide ceramic layer.

In a voltage nonlinear resistive element according to the present invention, the bismuth oxide layer may be formed on the zinc oxide ceramic layer by sputtering. This allows the bismuth oxide layer to be formed without exposing the zinc oxide ceramic layer to a high temperature. Thus, the volume resistivity of the zinc oxide ceramic layer is not increased by heat.

In a voltage nonlinear resistive element according to the present invention, the voltage nonlinear resistor may include two or more of the joined bodies stacked, and a bismuth oxide layer, or a bismuth oxide layer and a conductor layer, or a bismuth oxide layer, a conductor layer, and a bismuth oxide layer may be disposed between adjacent zinc oxide ceramic layers. Thus, the number of stacked joined bodies in the voltage nonlinear resistor can be adjusted for various varistor voltages.

The present invention is also directed to a method for manufacturing a voltage nonlinear resistive element, comprising the steps of:

(a) producing a joined body by forming a bismuth oxide layer composed mainly of bismuth oxide on a zinc oxide ceramic layer composed mainly of zinc oxide and having a volume resistivity of $1.0 \times 10^{-1}$ Ωcm or less by sputtering, (b) preparing at least two of the joined bodies, stacking the joined bodies with a conductor foil interposed between the bismuth oxide layer of one of the joined bodies and the zinc oxide ceramic layer of an adjacent joined body, or directly stacking the joined bodies without anything interposed therebetween, and heat-treating the joined bodies in stacked state in an inert atmosphere at a temperature in the range of 300° C. to 700° C., thereby producing a voltage nonlinear resistor in which the joined bodies are stacked and bonded to each other, and (c) forming a pair of electrodes such that an electrically conductive path passes through a junction between the zinc oxide ceramic layer and the bismuth oxide layer, or alternatively a method for manufacturing a voltage nonlinear resistive element, comprising the steps of:

(a) producing a joined body by forming a bismuth oxide layer composed mainly of bismuth oxide on a zinc oxide ceramic layer composed mainly of zinc oxide and having a volume resistivity of $1.0 \times 10^{-1}$ Ωcm or less by sputtering, (b) preparing at least two of the joined bodies, stacking the joined bodies with a conductor foil interposed between the bismuth oxide layer of one of the joined bodies and the bismuth oxide layer of an adjacent joined body, or directly stacking the joined bodies without anything interposed therebetween, and heat-treating the joined bodies in stacked state in an inert atmosphere at a temperature in the range of 300° C. to 700° C., thereby producing a layered voltage nonlinear resistor in which the joined bodies are stacked and bonded to each other, and (c) forming a pair of electrodes such that an electrically conductive path passes through a junction between the zinc oxide ceramic layer and the bismuth oxide layer.

This method can be used to relatively easily manufacture a voltage nonlinear resistive element that includes a plurality of stacked joined bodies in a voltage nonlinear resistor. Furthermore, because the heat treatment temperature in the step (b) ranges from 300° C. to 700° C. and is relatively low, this can prevent the volume resistivity of the zinc oxide ceramic layers from being increased by heat. In particular, this effect is significant when the heat treatment temperature in the step (b) ranges from 300° C. to 500° C.

DETAILED DESCRIPTION OF THE INVENTION

Figure 1:
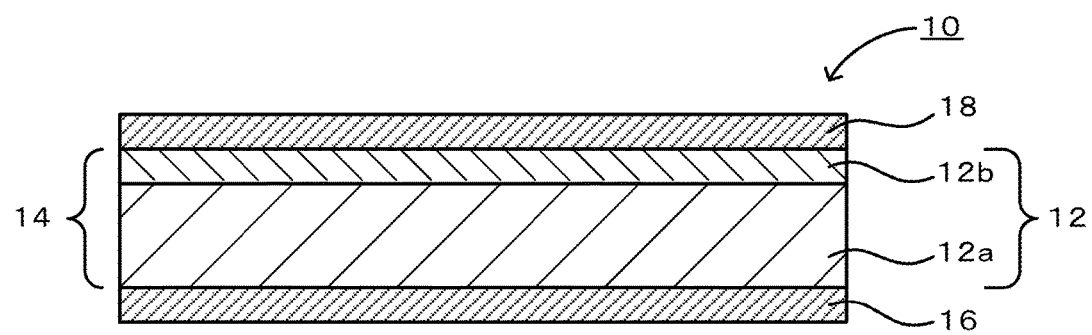
FIG. 1 is a cross-sectional view of a voltage nonlinear resistive element 10.

Preferred embodiments of the present invention will be described below with reference to the accompanying drawings. FIG. 1 is a cross-sectional view of a voltage nonlinear resistive element 10 according to the present embodiment.

The voltage nonlinear resistive element 10 includes a voltage nonlinear resistor (hereinafter abbreviated to a resistor) 14 and a pair of electrodes 16 and 18 disposed on opposite sides of the resistor 14.

The resistor 14 includes a joined body 12 in which a zinc oxide ceramic layer 12a is joined to a bismuth oxide layer 12b composed mainly of bismuth oxide. The zinc oxide ceramic layer 12a is a layer composed mainly of zinc oxide and having a volume resistivity of $1.0 \times 10^{-1}$ $\Omega$cm or less. The volume resistivity is preferably $1.0 \times 10^{-3}$ $\Omega$cm or less. This can result in a still lower clamping voltage in a high-current region than before. The bismuth oxide layer 12b preferably has a thickness in the range of 0.01 to 1 µm, more preferably 0.05 to 0.5 µm.

The pair of electrodes 16 and 18 are formed on the resistor 14 such that an electrically conductive path passes through a junction between the zinc oxide ceramic layer 12a and the bismuth oxide layer 12b. The electrodes 16 and 18 may be formed of any electrically conductive material that can form a satisfactory ohmic contact with the zinc oxide ceramic, for example, gold, silver, platinum, or aluminum. When a voltage is applied to the element such that the electrode 18 is an anode, an electric current can flow easily. On the other hand, when a voltage is applied to the element such that the electrode 16 is an anode, the element exhibits voltage nonlinearity.

An example of the manufacture of the voltage nonlinear resistive element 10 will be described below.

Formation of Zinc Oxide Ceramic Layer 12a

The zinc oxide ceramic layer 12a can be formed by cutting a plate material having a predetermined size from a zinc oxide ceramic block having a volume resistivity of $1.0 \times 10^{-1}$ $\Omega$cm or less, preferably $1.0 \times 10^{-3}$ $\Omega$cm or less. The zinc oxide ceramic block can be produced by dissolving a trivalent ion of Al, Ga, In, or the like in a zinc oxide ceramic as a dopant or by introducing an oxygen defect by firing a zinc oxide powder in a nonoxidizing atmosphere. A zinc oxide ceramic block in which a dopant is dissolved can be produced by first mixing a zinc oxide powder with an $Al_2O_3$, $Ga_2O_3$, $In_2O_3$, or another trivalent metal oxide powder such that the trivalent metal oxide constitutes 0.05% to 2.0% by mass and forming the mixed powder into a compact having a predetermined shape. The compact is then held in a nonoxidizing atmosphere (for example, a nitrogen or argon atmosphere) at a temperature in the range of 900° C. to 1200° C. for several hairs and is then fired at a temperature in the range of 1300° C. to 1500° C. for several hours. In this manner, a zinc oxide ceramic block having low volume resistivity can be relatively easily produced. In order to achieve the target volume resistivity, the mass percentage of the trivalent metal oxide powder to be mixed with the zinc oxide powder or the firing temperature may be adjusted. The zinc oxide powder used as a raw material preferably has an average particle size in the range of 0.02 to 5 µm. The trivalent metal oxide powder preferably has an average particle size in the range of 0.01 to 0.5 µm. The trivalent metal oxide powder is preferably an $Al_2O_3$ powder. The $Al_2O_3$ powder may be formed of θ-alumina, γ-alumina, or boehmite. In order to produce the zinc oxide ceramic block having low volume resistivity by firing the zinc oxide powder in a nonoxidizing atmosphere, for example, the zinc oxide powder is fired in a nonoxidizing atmosphere (for example, a nitrogen or argon atmosphere) at a temperature in the range of 1300° C. to 1500° C. for several hours.

Formation of Bismuth Oxide Layer 12b

The bismuth oxide layer 12b may be formed of bismuth oxide alone or may contain bismuth oxide as a main component and another oxide (for example, $Sb_2O_3$, $Cr_2O_3$, MnO, CoO, ZnO, and/or $SiO_2$) as an accessory component. The bismuth oxide layer 12b formed of bismuth oxide alone may be formed on the zinc oxide ceramic layer 12a by sputtering a target of bismuth oxide. Instead of sputtering, vacuum evaporation or ion plating may also be used. The bismuth oxide layer 12b may also be formed by applying a paste containing a bismuth oxide powder to the zinc oxide ceramic layer 12a, drying the paste, and heat-treating the dried product at a relatively low temperature (for example, in the range of 200° C. to 700° C., preferably 200° C. to 500° C.). The bismuth oxide layer 12b containing an accessory component may be formed on the zinc oxide ceramic layer 12a by simultaneously sputtering targets of bismuth oxide and the accessory component. The bismuth oxide layer 12b may also be formed by applying a paste containing a bismuth oxide powder and an accessory component powder to the zinc oxide ceramic layer 12a, drying the paste, and heat-treating the dried product at a relatively low temperature. In the case of heat treatment, the volume resistivity of the zinc oxide ceramic layer 12a is less likely to be increased by heating because the temperature is relatively low. However, because sputtering can be performed at a lower temperature, sputtering can eliminate the possibility of such an increase in volume resistivity.

Formation of Electrodes 16 and 18

In the present embodiment, the resistor 14 includes one joined body 12 in which the zinc oxide ceramic layer 12a is joined to the bismuth oxide layer 12b. The electrodes 16 and 18 can be formed on both sides of the resistor 14 by vapor deposition or sputtering of an electrode material. The electrode material may be gold, silver, platinum, or aluminum. Plate-shaped electrodes 16 and 18 may be joined to the resistor 14 with an electrically conductive joint member.

When a voltage is applied to the voltage nonlinear resistive element 10 described above in detail such that the electrode 16 is an anode, the voltage nonlinear resistive element 10 exhibits voltage nonlinearity. Thus, the clamping voltage in a high-current region (for example, in the case that an electric current of 20 A/cm² flows) can be lower than before. As a result, for example, even when a large current flows through the voltage nonlinear resistive element 10 due to static electricity, a rise in voltage can be decreased, and the dielectric breakdown of the element can be prevented.

The present invention should not be limited to the embodiments described above and can be implemented in various aspects within the scope of the present invention.

For example, although the voltage nonlinear resistive element 10 includes the electrodes 16 and 18 on both sides of the resistor 14 containing one joined body 12, the resistor 14 may be replaced with a layered resistor composed of a plurality of joined bodies 12. Such a layered resistor can be used to control the varistor voltage. Thus, it is possible to manufacture a voltage nonlinear resistive element that has a varistor voltage suitable for the intended application. Examples that include a layered resistor are illustrated in FIGS. 2 to 5.

Figure 2:
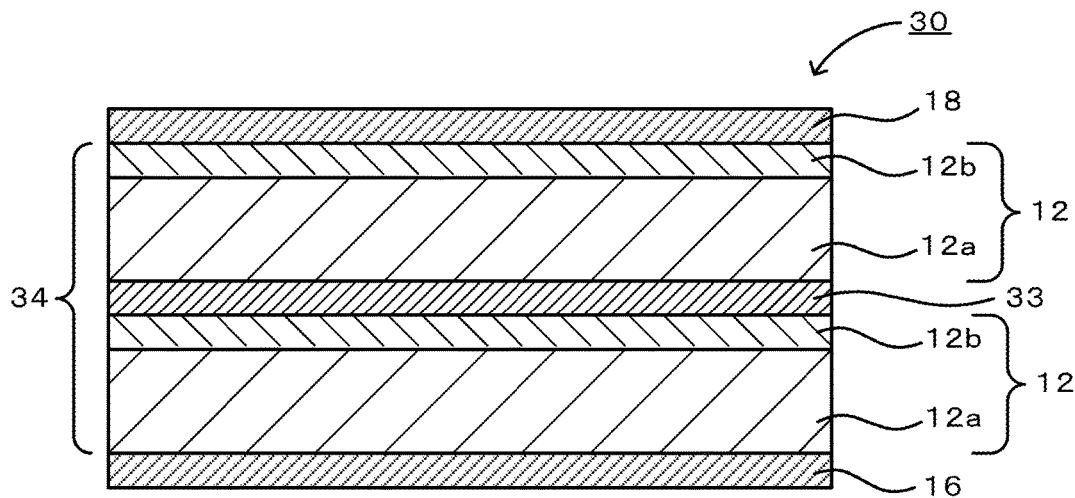
FIG. 2 is a cross-sectional view of a voltage nonlinear resistive element 30.

A voltage nonlinear resistive element 30 illustrated in FIG. 2 includes a layered resistor 34 and electrodes 16 and 18 disposed on both sides of the layered resistor 34. The layered resistor 34 includes two joined bodies 12 stacked with a conductor layer 33 interposed therebetween. In the resistor 34, a bismuth oxide layer 12b and the conductor layer 33 are disposed between adjacent zinc oxide ceramic layers 12a. The resistor 34 can be manufactured as described below. First, two joined bodies 12 are prepared. A zinc oxide ceramic layer 12a of one of the joined bodies 12 is brought into contact with a bismuth oxide layer 12b of the other of the joined bodies 12 with a brazing filler (for example, Au—Ge alloy foil, Au—Sn alloy foil, or Au—Si alloy foil), which is a conductor foil, interposed therebetween. These are pressed into a single piece. The piece is heated at a predetermined joining temperature (for example, 300° C. to 700° C., preferably 300° C. to 500° C.) in an inert atmosphere for a predetermined time and is then cooled. This allows the brazing filler to be melted or softened and then solidified and form the conductor layer 33, thus constituting the resistor 34. The voltage nonlinear resistive element 30 has the same advantages as the element 10. Because the layered resistor 34 includes the two joined bodies 12, the clamping voltage can be approximately twice the clamping voltage of the voltage nonlinear resistive element 10 according to Example 1. Furthermore, when the resistance of the zinc oxide ceramic layers 12a is decreased by adding a large amount of dopant (trivalent ion) to a zinc oxide ceramic or by forming a large number of oxygen deficiencies by heat treatment in an inert atmosphere, an excessively high joining temperature (for example, 900° C. or 1000° C.) sometimes results in high resistance due to precipitation of the dopant or elimination of the oxygen deficiencies. In this embodiment, however, because the joining temperature is 700° C. or less, preferably 500° C. or less, the zinc oxide ceramic layers 12a can have consistently low resistance.

Figure 3:
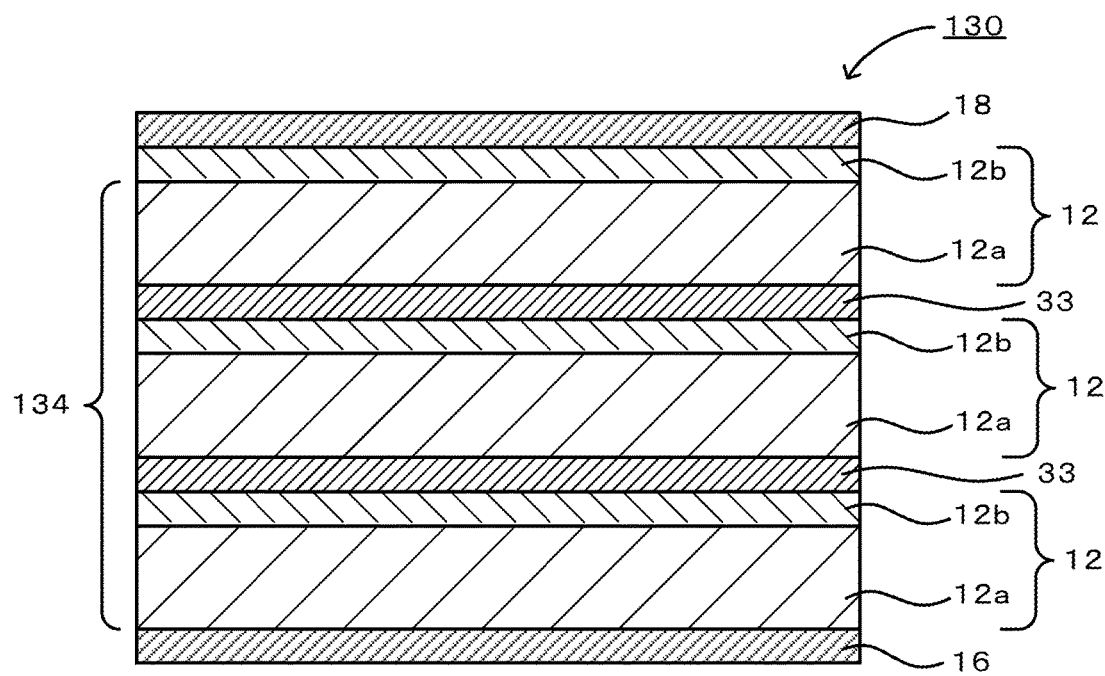
FIG. 3 is a cross-sectional view of a voltage nonlinear resistive element 130.

A voltage nonlinear resistive element 130 illustrated in FIG. 3 includes a layered resistor 134 and electrodes 16 and 18 disposed on both sides of the layered resistor 134. The layered resistor 134 includes three joined bodies 12 stacked with a conductor layer 33 interposed therebetween. In the resistor 134, a bismuth oxide layer 12b and the conductor layer 33 are disposed between adjacent zinc oxide ceramic layers 12a. The voltage nonlinear resistive element 130 has the same basic structure and advantages as the voltage nonlinear resistive element 30 illustrated in FIG. 2 and is therefore not described in detail. Because the layered resistor 134 in the element 130 includes the three joined bodies 12, the clamping voltage can be approximately three times the clamping voltage of the voltage nonlinear resistive element 10 according to Example 1.

Figure 4:
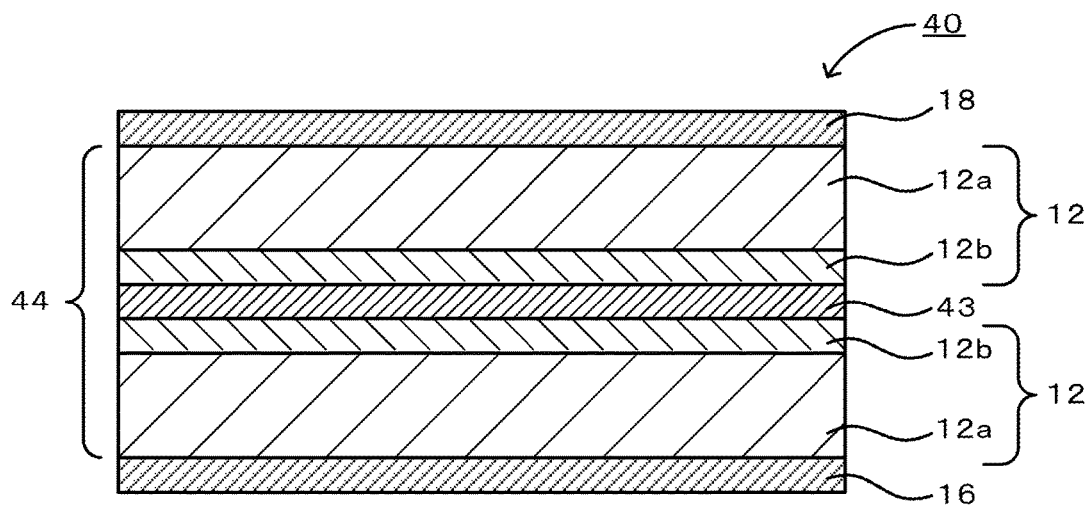
FIG. 4 is a cross-sectional view of a voltage nonlinear resistive element 40.

A voltage nonlinear resistive element 40 illustrated in FIG. 4 includes a layered resistor 44 and electrodes 16 and 18 disposed on both sides of the layered resistor 44. The layered resistor 44 includes two joined bodies 12 stacked with a conductor layer 43 interposed therebetween. In the resistor 44, a bismuth oxide layer 12b, the conductor layer 43, and another bismuth oxide layer 12b are disposed between adjacent zinc oxide ceramic layers 12a. The resistor 44 can be manufactured as described below. First, two joined bodies 12 are prepared. A bismuth oxide layer 12b of one of the joined bodies 12 is brought into contact with a bismuth oxide layer 12b of the other of the joined bodies 12 with the brazing filler interposed therebetween. These are pressed into a single piece. In the same manner as in the voltage nonlinear resistive element 30, heat treatment in an inert atmosphere allows the brazing filler to be melted or softened and then solidified and form the conductor layer 43, thus constituting the resistor 44. When a voltage is applied to the voltage nonlinear resistive element 40 such that the electrode 16 or the electrode 18 is an anode, the voltage nonlinear resistive element 40 exhibits voltage nonlinearity. The clamping voltage of the voltage nonlinear resistive element 40 is almost the same as the clamping voltage of the voltage nonlinear resistive element 10 according to Example 1. Furthermore, for the reason described above for the voltage nonlinear resistive element 30, the zinc oxide ceramic layers 12a can have consistently low resistance.

Figure 5:
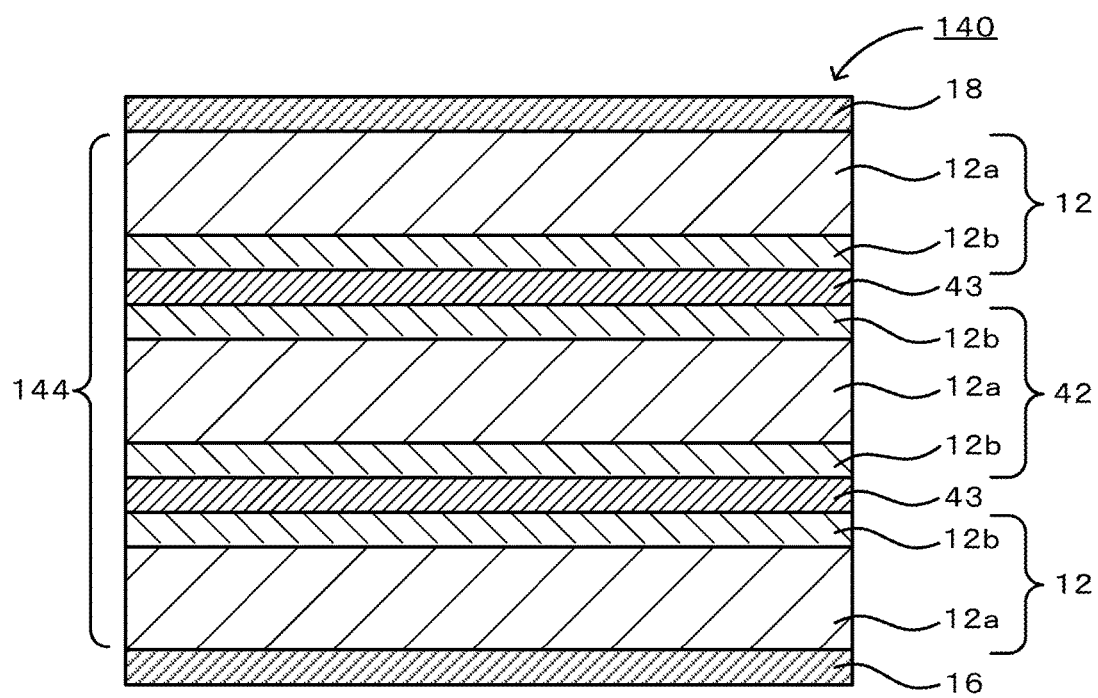
FIG. 5 is a cross-sectional view of a voltage nonlinear resistive element 140.

A voltage nonlinear resistive element 140 illustrated in FIG. 5 includes a layered resistor 144 and electrodes 16 and 18 disposed on both sides of the layered resistor 144. The layered resistor 144 includes two joined bodies 12 and one joined body 42 having a three-layer structure stacked with a conductor layer 43 interposed therebetween. In the resistor 144, a bismuth oxide layer 12b, the conductor layer 43, and another bismuth oxide layer 12b are disposed between adjacent zinc oxide ceramic layers 12a. The resistor 144 can be manufactured as described below. First, two joined bodies 12 are prepared. A zinc oxide ceramic layer 12a is overlaid with a bismuth oxide layer 12b on both sides thereof, thereby producing the joined body 42 having the three-layer structure. A bismuth oxide layer 12b of one of the joined bodies 12 is brought into contact with one of the bismuth oxide layers 12b of the joined body 42 having the three-layer structure with the brazing filler interposed therebetween. The other of the bismuth oxide layers 12b of the joined body 42 having the three-layer structure is brought into contact with a bismuth oxide layer 12b of the other of the joined bodies 12 with the brazing filler interposed therebetween. These are pressed into a single piece. In the same manner as in the voltage nonlinear resistive element 30, heat treatment in an inert atmosphere allows the brazing filler to be melted or softened and then solidified and form the conductor layer 43, thus constituting the resistor 144. When a voltage is applied to the voltage nonlinear resistive element 140 such that the electrode 16 or the electrode 18 is an anode, the voltage nonlinear resistive element 140 exhibits voltage nonlinearity. The clamping voltage of the voltage nonlinear resistive element 140 is approximately twice the clamping voltage of the voltage nonlinear resistive element 10 according to Example 1.

Although a plurality of joined bodies 12 in the embodiments illustrated in FIGS. 2 to 5 are joined with the conductor layer 33 or 43 interposed therebetween, the joined bodies 12 may be directly joined without the brazing filler. Also in such a case, the joined bodies are preferably joined at a relatively low temperature (for example, 300° C. to 700° C., preferably 300° C. to 500° C.).

EXAMPLES

Example 1

Zinc oxide (average particle size 1.5 µm) was mixed with 1% by mass θ-alumina (average particle size 0.02 µm). The mixture was shaped to form a compact. The compact was held in a $N_2$ atmosphere at 1100° C. for 5 hours and was then fired at 1400° C. for 5 hours, thereby producing a zinc oxide ceramic block. The zinc oxide ceramic block had a volume resistivity of $9.3 \times 10^{-4}$ Ωcm. A 10 mm×10 mm×1 mm zinc oxide ceramic sheet was cut from the zinc oxide ceramic block. After the sheet was polished and washed, a sputtered bismuth oxide film (thickness 0.3 µm) was formed on the zinc oxide ceramic sheet by high-frequency plasma sputtering using a target of bismuth oxide, thereby producing a joined body. RFS-200 manufactured by ULVAC KIKO, Inc. was used for sputtering. The deposition conditions were as follows: target size: 80 mm in diameter, RF output: 20 W, gas pressure (Ar): 2.0 Pa, deposition time: 15 minutes.

Figure 6:
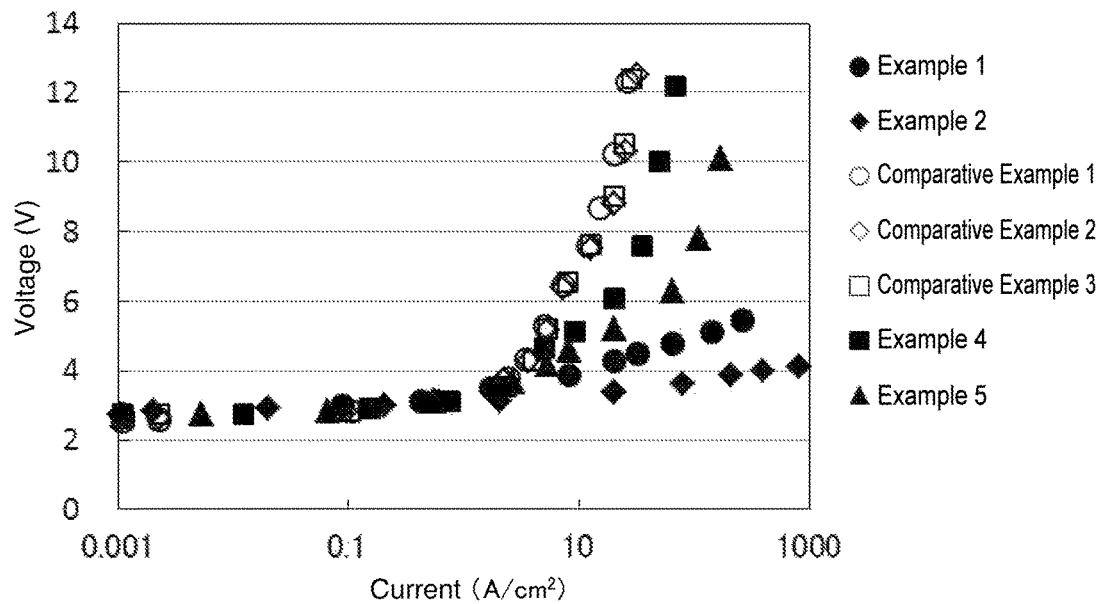
FIG. 6 is a graph of the electric current-voltage characteristics of voltage nonlinear resistive elements according to Examples 1 and 2 and Comparative Examples 1 to 3.

The joined body was directly used as a resistor. An Al vapor deposition electrode was formed on both sides of the resistor. Thus, a voltage nonlinear resistive element was manufactured (see FIG. 1). Electric current-voltage characteristics were measured by applying a voltage between the electrodes of the voltage nonlinear resistive element. The electrode on the zinc oxide ceramic sheet was an anode, and the electrode on the sputtered bismuth oxide film was a cathode. Table 1 and FIG. 6 show the results. The clamping voltage at an electric current corresponding to 1 mA/cm² was 2.7 V, and the clamping voltage at an electric current corresponding to 20 A/cm² was 4.3 V.

electric current corresponding to 1 mA/cm² was 2.7 V, and the clamping voltage at an electric current corresponding to 20 A/cm² was 3.4 V.

Comparative Example 1

Aqueous aluminum nitrate was added to zinc oxide. The amount of aluminum nitrate was 0.001% by mass on an $Al_2O_3$ basis. The water content of the product was adjusted to be 50% by mass by the addition of water. Minute amounts of binder and antifoaming agent were added to the product. The product was agitated by ultrasonic waves for 30 minutes and with an impeller blade for 30 minutes. After agitation, the product was granulated with a spray dryer to produce a granulated powder. The granulated powder was passed through a sifter having a sieve opening of 200 µm, was shaped, was degreased, and was fired in the air at 1400° C. for 5 hours, thereby producing a zinc oxide ceramic block. The zinc oxide ceramic block had a volume resistivity of $3.0 \times 10^{-1}$ Ωcm. A 10 mm×10 mm×1 mm zinc oxide ceramic sheet was cut from the zinc oxide ceramic block. A sputtered bismuth oxide film was formed on the zinc oxide ceramic sheet in the same manner as in Example 1, thereby producing a joined body. The joined body was directly used as a resistor. An Al vapor deposition electrode was formed on both sides of the resistor. Thus, a voltage nonlinear resistive element was manufactured. Electric current-voltage characteristics were measured by applying a voltage between the electrodes of the voltage nonlinear resistive element in the same manner as in Example 1. Table 1 and FIG. 6 show the results. The clamping voltage at an electric current corresponding to 1 mA/cm² was 2.5 V, and the clamping voltage at an electric current corresponding to 20 A/cm² was 10.2 V.

Comparative Example 2

A zinc oxide ceramic block was produced in the same manner as in Comparative Example 1 except that the aque-

TABLE 1

|  | Examples | | | | Comparative Examples | | |
| --- | --- | --- | --- | --- | --- | --- | --- |
|  | 1 | 2 | 4 | 5 | 1 | 2 | 3 |
| Volume Resistivity of Zinc Oxide Ceramic Layer (Ωcm) | $9.3 \times 10^{-4}$ | $1.1 \times 10^{-4}$ | $1.0 \times 10^{-1}$ | $8.9 \times 10^{-3}$ | $3.0 \times 10^{-1}$ | $1.5 \times 10^{-1}$ | $2.1 \times 10^{-1}$ |
| $V_{1\ mA/cm2}(V)$*1 | 2.7 | 2.7 | 2.6 | 2.7 | 2.5 | 2.6 | 2.7 |
| $V_{20\ A/cm2}(V)$*2 | 4.3 | 3.4 | 6.1 | 5.2 | 10.2 | 8.8 | 9.0 |

*1Clamping voltage at an electric current corresponding to 1 mA/cm²
*2Clamping voltage at an electric current corresponding to 20 A/cm²

Example 2

A zinc oxide ceramic block was produced in the same manner as in Example 1 except that zinc oxide was mixed with 2% by mass θ-alumina. The zinc oxide ceramic block had a volume resistivity of $1.1 \times 10^{-4}$ Ωcm. A 10 mm×10 mm×1 mm zinc oxide ceramic sheet was cut from the zinc oxide ceramic block. The sheet is used to produce a joined body in the same manner as in Example 1. The joined body was directly used as a resistor. An Al vapor deposition electrode was formed on both sides of the resistor. Thus, a voltage nonlinear resistive element was manufactured. Electric current-voltage characteristics were measured by applying a voltage between the electrodes of the voltage nonlinear resistive element in the same manner as in Example 1. Table 1 and FIG. 6 show the results. The clamping voltage at an ous aluminum nitrate was added to zinc oxide such that the amount of aluminum nitrate was 0.002% by mass on an $Al_2O_3$ basis. The zinc oxide ceramic block had a volume resistivity of $1.5 \times 10^{-1}$ Ωcm. A 10 mm×10 mm×1 mm zinc oxide ceramic sheet was cut from the zinc oxide ceramic block. The sheet is used to produce a joined body in the same manner as in Example 1. The joined body was directly used as a resistor. An Al vapor deposition electrode was formed on both sides of the resistor. Thus, a voltage nonlinear resistive element was manufactured. Electric current-voltage characteristics were measured by applying a voltage between the electrodes of the voltage nonlinear resistive element in the same manner as in Example 1. Table 1 and FIG. 6 show the results. The clamping voltage at an electric current corresponding to 1 mA/cm² was 2.6 V, and the clamping voltage at an electric current corresponding to 20 A/cm² was 8.8 V.

Comparative Example 3

$Co_3O_4$, $MnO_2$, and NiO powders were added to zinc oxide such that the amounts of $Co_3O_4$, $MnO_2$, and NiO were 1.2%, 0.50%, and 0.47% by mass of the amount of zinc oxide, respectively. An aqueous aluminum nitrate was added to the zinc oxide such that the amount of aluminum nitrate was 0.0018% by mass on an $Al_2O_3$ basis. The mixed powder was shaped and was subjected to hot-press firing in the air at 1300° C. for 1 hour, thereby producing a zinc oxide ceramic block. The zinc oxide ceramic block had a volume resistivity of $2.1 \times 10^{-1}$ Ωcm. A 10 mm×10 mm×1 mm zinc oxide ceramic sheet was cut from the zinc oxide ceramic block. The sheet is used to produce a joined body in the same manner as in Example 1. The joined body was directly used as a resistor. An Al vapor deposition electrode was formed on both sides of the resistor. Thus, a voltage nonlinear resistive element was manufactured. Electric current-voltage characteristics were measured by applying a voltage between the electrodes of the voltage nonlinear resistive element in the same manner as in Example 1. Table 1 and FIG. 6 show the results. The clamping voltage at an electric current corresponding to 1 mA/cm$^2$ was 2.7 V, and the clamping voltage at an electric current corresponding to 20 A/cm$^2$ was 9.0 V.

Voltage generated in a high-current region (for example, a region of 20 A/cm$^2$ or more) was lower in the voltage nonlinear resistive elements according to Examples 1 and 2, which included the zinc oxide ceramic sheet having a volume resistivity of $1.0 \times 10^{-1}$ Ωcm or less (particularly $1.0 \times 10^{-3}$ Ωcm or less), than in the voltage nonlinear resistive element according to Comparative Example 1, which included the zinc oxide ceramic sheet having a volume resistivity of $3.0 \times 10^{-1}$ Ωcm. Thus, the voltage nonlinear resistive elements according to Examples 1 and 2 had an improved electronic circuit protective function.

Example 3

Two joined bodies were prepared in the same manner as in Example 2. A zinc oxide ceramic sheet of one of the joined bodies was brought into contact with a sputtered bismuth oxide film of the other of the joined bodies with a Au—Ge alloy (the mass ratio of Au/Ge=88/12) foil (thickness 50 μm) interposed therebetween. The joined bodies in this state were joined by heat treatment in an inert atmosphere at 420° C. for 10 minutes, thereby producing a layered resistor. An Al vapor deposition electrode was formed on both sides of the resistor. Thus, a voltage nonlinear resistive element was manufactured (see FIG. 2). Electric current-voltage characteristics were measured by applying a voltage between the electrodes of the voltage nonlinear resistive element. The electrode on the zinc oxide ceramic sheet was an anode, and the electrode on the sputtered film was a cathode. As a result, although not shown in the figure, the voltage nonlinear resistive element had the voltage nonlinear resistance characteristics similar to that in Example 2. The clamping voltage in a nonlinearity region (a region having an electric current in the range of 0.01 to 2 A/cm$^2$) in this case was approximately twice the clamping voltage in Example 2.

Example 4

A zinc oxide ceramic block was produced in the same manner as in Comparative Example 1 except that the aqueous aluminum nitrate was added to zinc oxide such that the amount of aluminum nitrate was 0.1% by mass on an $Al_2O_3$ basis. The zinc oxide ceramic block had a volume resistivity of $1.0 \times 10^{-1}$ Ωcm. A 10 mm×10 mm×1 mm zinc oxide ceramic sheet was cut from the zinc oxide ceramic block. The sheet is used to produce a joined body in the same manner as in Example 1. The joined body was directly used as a resistor. An Al vapor deposition electrode was formed on both sides of the resistor. Thus, a voltage nonlinear resistive element was manufactured. Electric current-voltage characteristics were measured by applying a voltage between the electrodes of the voltage nonlinear resistive element in the same manner as in Example 1. Table 1 and FIG. 6 show the results. The clamping voltage at an electric current corresponding to 1 mA/cm$^2$ was 2.6 V, and the clamping voltage at an electric current corresponding to 20 A/cm$^2$ was 6.1 V.

Example 5

A zinc oxide ceramic block was produced in the same manner as in Example 1 except that zinc oxide was mixed with 0.5% by mass θ-alumina. The zinc oxide ceramic block had a volume resistivity of $8.9 \times 10^{-3}$ Ωcm. A 10 mm×10 mm×1 mm zinc oxide ceramic sheet was cut from the zinc oxide ceramic block. The sheet is used to produce a joined body in the same manner as in Example 1. The joined body was directly used as a resistor. An Al vapor deposition electrode was formed on both sides of the resistor. Thus, a voltage nonlinear resistive element was manufactured. Electric current-voltage characteristics were measured by applying a voltage between the electrodes of the voltage nonlinear resistive element in the same manner as in Example 1. Table 1 and FIG. 6 show the results. The clamping voltage at an electric current corresponding to 1 mA/cm$^2$ was 2.7 V, and the clamping voltage at an electric current corresponding to 20 A/cm$^2$ was 5.2 V.

Figure 7:
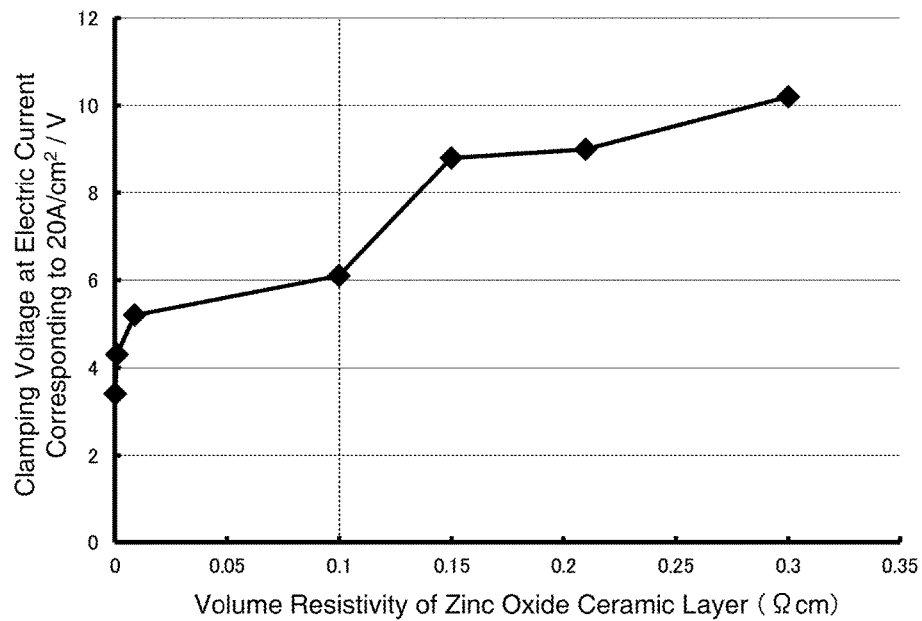
FIG. 7 is a graph of the relationship between the volume resistivity ($\Omega$cm) of a zinc oxide ceramic layer and clamping voltage at an electric current corresponding to 20 A/cm$^2$.

A graph in FIG. 7 shows the relationship between the volume resistivity (Ωcm) of a zinc oxide ceramic layer and clamping voltage at an electric current corresponding to 20 A/cm$^2$ on the basis of Examples 1, 2, 4, and 5 and Comparative Examples 1 to 3. FIG. 7 shows that when the volume resistivity of a zinc oxide ceramic layer crosses a threshold of $1.0 \times 10^{-1}$ Ωcm, the clamping voltage at an electric current corresponding to 20 A/cm$^2$ changes significantly. More specifically, when the volume resistivity of a zinc oxide ceramic layer is more than $1.0 \times 10^{-1}$ Ωcm, this results in high clamping voltages at an electric current corresponding to 20 A/cm$^2$, and when the volume resistivity is $1.0 \times 10^{-1}$ Ωcm or less, this results in very low clamping voltages.

Example 6

A 10 mm×10 mm×1 mm zinc oxide ceramic sheet was cut from a zinc oxide ceramic block produced in the same manner as in Example 2. After the sheet was polished and washed, a sputtered film composed mainly of bismuth oxide (thickness 0.3 μm) was formed on the zinc oxide ceramic sheet by high-frequency plasma sputtering using a target, thereby producing a joined body. The target was produced by mixing $Sb_2O_3$, $CO_3O_4$, and $MnO_2$ powders with bismuth oxide such that the amounts of $Sb_2O_3$, $Co_3O_4$, and $MnO_2$ were 2.5%, 6.7%, and 1.8% by mass of the amount of bismuth oxide, respectively, shaping the mixture, and firing the shaped mixture in the air at 700° C. for 2 hairs. RFS-200 manufactured by ULVAC KIKO, Inc. was used for sputtering. The deposition conditions were as follows: target size:

80 mm in diameter, RF output: 20 W, gas pressure (Ar): 2.0 Pa, deposition time: 20 minutes. The joined body was directly used as a resistor. An Al vapor deposition electrode was formed on both sides of the resistor. Thus, a voltage nonlinear resistive element was manufactured. Electric current-voltage characteristics were measured by applying a voltage between the electrodes of the voltage nonlinear resistive element in the same manner as in Example 1. As a result, although not shown in the figure, the voltage nonlinear resistive element had the voltage nonlinear resistance characteristics similar to that in Example 2. Table 2 shows the results. The clamping voltage at an electric current corresponding to 1 mA/cm$^2$ was 2.6 V, and the clamping voltage at an electric current corresponding to 20 A/cm$^2$ was 3.2 V.

TABLE 2

|  | Examples | | | Comparative Examples |
| --- | --- | --- | --- | --- |
|  | 6 | 7 | 8 | 4 |
| Heat Treatment Temperature (° C.) | — | 420 | 700 | 900 |
| $V_{1\ mA/cm2}(V)$*[1] | 2.6 | 5.2 | 5.3 | 5.3 |
| $V_{20\ A/cm2}(V)$*[2] | 3.2 | 6.4 | 6.6 | 15.0 |

*[1]Clamping voltage at an electric current corresponding to 1 mA/cm$^2$
*[2]Clamping voltage at an electric current corresponding to 20 A/cm$^2$ Example 7

Two joined bodies were prepared in the same manner as in Example 6. A zinc oxide ceramic sheet of one of the joined bodies was brought into contact with a sputtered bismuth oxide film of the other of the joined bodies with a Au—Ge alloy (the mass ratio of Au/Ge=88/12) foil (thickness 50 μm) interposed therebetween. The joined bodies in this state were joined by heat treatment in an inert atmosphere at 420° C. for 10 minutes, thereby producing a layered resistor. An Al vapor deposition electrode was formed on both sides of the resistor. Thus, a voltage nonlinear resistive element was manufactured (see FIG. 2). Electric current-voltage characteristics were measured by applying a voltage between the electrodes of the voltage nonlinear resistive element. The electrode on the zinc oxide ceramic sheet was an anode, and the electrode on the sputtered film was a cathode. Electric current-voltage characteristics were measured by applying a voltage between the electrodes of the voltage nonlinear resistive element in the same manner as in Example 1. As a result, although not shown in the figure, the voltage nonlinear resistive element had the voltage nonlinear resistance characteristics similar to that in Example 2. Table 2 shows the results. The clamping voltage at an electric current corresponding to 1 mA/cm$^2$ was 5.2 V, and the clamping voltage at an electric current corresponding to 20 A/cm$^2$ was 6.4 V. These clamping voltages are twice the clamping voltages in Example 6.

Example 8

Two joined bodies were prepared in the same manner as in Example 6. A zinc oxide ceramic sheet of one of the joined bodies was brought into contact with a sputtered bismuth oxide film of the other of the joined bodies with a Ag foil (thickness 20 μm) interposed therebetween. The joined bodies were joined by heat treatment in an inert atmosphere at 700° C. for 30 minutes, thereby producing a layered resistor. An Al vapor deposition electrode was formed on both sides of the resistor. Thus, a voltage nonlinear resistive element was manufactured (see FIG. 2). Electric current-voltage characteristics were measured by applying a voltage between the electrodes of the voltage nonlinear resistive element. The electrode on the zinc oxide ceramic sheet was an anode, and the electrode on the sputtered film was a cathode. Electric current-voltage characteristics were measured by applying a voltage between the electrodes of the voltage nonlinear resistive element in the same manner as in Example 1. As a result, although not shown in the figure, the voltage nonlinear resistive element had the voltage nonlinear resistance characteristics similar to that in Example 2. Table 2 shows the results. The clamping voltage at an electric current corresponding to 1 mA/cm$^2$ was 5.3 V, and the clamping voltage at an electric current corresponding to 20 A/cm$^2$ was 6.6 V. These clamping voltages are approximately twice the clamping voltages in Example 6.

Comparative Example 4

Two joined bodies were prepared in the same manner as in Example 6. A zinc oxide ceramic sheet of one of the joined bodies was brought into contact with a sputtered bismuth oxide film of the other of the joined bodies with a Ag foil (thickness 20 μm) interposed therebetween. The joined bodies were joined by heat treatment in an inert atmosphere at 900° C. for 30 minutes, thereby producing a layered resistor. An Al vapor deposition electrode was formed on both sides of the resistor. Thus, a voltage nonlinear resistive element was manufactured (see FIG. 2). Electric current-voltage characteristics were measured by applying a voltage between the electrodes of the voltage nonlinear resistive element. The electrode on the zinc oxide ceramic sheet was an anode, and the electrode on the sputtered film was a cathode. Electric current-voltage characteristics were measured by applying a voltage between the electrodes of the voltage nonlinear resistive element in the same manner as in Example 1. As a result, depending on resistors thus manufactured, some resistive elements exhibited voltage nonlinear resistance characteristics, and some resistive elements did not exhibit voltage nonlinear resistance characteristics. Table 2 shows the results. For the resistive elements that exhibited voltage nonlinear resistance characteristics, the clamping voltage at an electric current corresponding to 1 mA/cm was 5.3 V, and the clamping voltage at an electric current corresponding to 20 A/cm$^2$ was 15.0 V, which is still more than twice the clamping voltage in Example 6.

Examples 6 to 8 and Comparative Example 4 show that when a bismuth oxide layer contains an oxide other than bismuth oxide ($Sb_2O_3$, $Co_3O_4$, and $MnO_2$ in these examples), joining of joined bodies by heat treatment at a temperature of more than 700° C. results in unstable voltage nonlinear characteristics and high clamping voltages. Thus, the resulting voltage nonlinear resistive elements may have high voltages in a high-current region.

These examples are only examples of the present invention and do not limit the present invention.

This application claims priorities from Japanese patent application No. 2014-056497 filed on Mar. 19, 2014, the entire contents of both of which are incorporated herein by reference.

What is claimed is:

1. A voltage nonlinear resistive element, comprising:
  a voltage nonlinear resistor containing at least two joined bodies in each of which a zinc oxide ceramic layer composed mainly of zinc oxide and having a volume resistivity of $1.0 \times 10^{-1}$ Ωcm or less is joined to a bismuth oxide layer composed mainly of bismuth oxide, and a pair of electrodes disposed on the voltage nonlinear resistor such that an electrically conductive path passes through a junction between the zinc oxide ceramic layer and the bismuth oxide layer, wherein (i) a bismuth oxide layer, or (ii) a bismuth oxide layer and a conductor layer, or (iii) a bismuth oxide layer, a conductor layer, and a bismuth oxide layer are disposed between adjacent zinc oxide ceramic layers.

2. The voltage nonlinear resistive element according to claim 1, wherein the zinc oxide ceramic layer contains one or more selected from the group consisting of $Al_2O_3$, $In_2O_3$, and $Ga_2O_3$.

3. The voltage nonlinear resistive element according to claim 1, wherein the bismuth oxide layer is formed on the zinc oxide ceramic layer by sputtering.

4. A method for manufacturing a voltage nonlinear resistive element, comprising the steps of:
  (a) producing a joined body by forming a bismuth oxide layer composed mainly of bismuth oxide on a zinc oxide ceramic layer composed mainly of zinc oxide and having a volume resistivity of $1.0 \times 10^{-1}$ Ωcm or less by sputtering,
  (b) preparing at least two of the joined bodies, stacking the joined bodies with a conductor foil interposed between the bismuth oxide layer of one of the joined bodies and the bismuth oxide layer of an adjacent joined body, or directly stacking the joined bodies without anything interposed therebetween, and heat-treating the joined bodies in stacked state in an inert atmosphere at a temperature in the range of 300° C. to 700° C., thereby producing a layered voltage nonlinear resistor in which the joined bodies are stacked and bonded to each other, and
  (c) forming a pair of electrodes such that an electrically conductive path passes through a junction between the zinc oxide ceramic layer and the bismuth oxide layer.

5. A method for manufacturing a voltage nonlinear resistive element, comprising the steps of:
  (a) producing a joined body by forming a bismuth oxide layer composed mainly of bismuth oxide on a zinc oxide ceramic layer composed mainly of zinc oxide and having a volume resistivity of $1.0 \times 10^{-1}$ Ωcm or less by sputtering,
  (b) preparing at least two of the joined bodies, stacking the joined bodies with a conductor foil interposed between the bismuth oxide layer of one of the joined bodies and the zinc oxide ceramic layer of an adjacent joined body, or directly stacking the joined bodies without anything interposed therebetween, and heat-treating the joined bodies in stacked state in an inert atmosphere at a temperature in the range of 300° C. to 700° C., thereby producing a voltage nonlinear resistor in which the joined bodies are stacked and bonded to each other, and
  (c) forming a pair of electrodes such that an electrically conductive path passes through a junction between the zinc oxide ceramic layer and the bismuth oxide layer.

6. The method for manufacturing a voltage nonlinear resistive element according to claim 4, wherein the heat treatment temperature in the step (b) ranges from 300° C. to 500° C.

7. The method for manufacturing a voltage nonlinear resistive element according to claim 5, wherein the heat treatment temperature in the step (b) ranges from 300° C. to 500° C.

* * * * *